United States Patent
Morin et al.

(10) Patent No.: US 8,362,875 B2
(45) Date of Patent: Jan. 29, 2013

(54) SECURE SYSTEM FOR NON-COVERT USER AUTHENTICATION AND IDENTIFICATION

(75) Inventors: Philippe Morin, Goleta, CA (US); Rabindra Pathak, San Jose, CA (US)

(73) Assignee: Panasonic Corporation, Osaka (JP)

( * ) Notice: Subject to any disclaimer, the term of this patent is extended or adjusted under 35 U.S.C. 154(b) by 962 days.

(21) Appl. No.: 12/328,878

(22) Filed: Dec. 5, 2008

(65) Prior Publication Data

US 2010/0073126 A1 Mar. 25, 2010

Related U.S. Application Data

(60) Provisional application No. 61/099,613, filed on Sep. 24, 2008.

(51) Int. Cl.
*G05B 23/00* (2006.01)
*G05B 19/00* (2006.01)
*G09C 1/06* (2006.01)
*G09C 1/12* (2006.01)
*G06K 9/00* (2006.01)
*G06F 21/00* (2006.01)

(52) U.S. Cl. ...... 340/5.55; 340/5.2; 340/5.54; 340/5.65; 340/5.8; 380/56; 380/57; 380/58; 382/181; 382/189; 713/182; 713/183

(58) Field of Classification Search .................. 340/5.22, 340/5.55
See application file for complete search history.

(56) References Cited

U.S. PATENT DOCUMENTS

| | | | | |
|---|---|---|---|---|
| 5,465,084 A | * | 11/1995 | Cottrell | 340/5.27 |
| 5,583,950 A | * | 12/1996 | Prokoski | 382/212 |
| 5,721,583 A | | 2/1998 | Harada et al. | |
| 5,724,423 A | | 3/1998 | Khello | |
| 6,144,756 A | | 11/2000 | Takahashi et al. | |
| 6,193,153 B1 | | 2/2001 | Lambert | |
| 6,256,019 B1 | | 7/2001 | Allport | |
| 6,351,634 B1 | | 2/2002 | Shin | |
| 7,188,314 B2 | | 3/2007 | Mizrah | |
| 7,616,764 B2 | * | 11/2009 | Varghese et al. | 380/255 |

\* cited by examiner

*Primary Examiner* — Jennifer Mehmood
*Assistant Examiner* — John Mortell
(74) *Attorney, Agent, or Firm* — Harness, Dickey & Pierce, P.L.C.

(57) ABSTRACT

A secure system for user authentication comprised of an authentication interface having a character dial and alignment markers is provided. A passcode input module receives user commands to move the character dial with respect to the alignment markers and to record a configuration of the characters with respect to the alignment markers, thereby creating alignment configuration data. A passcode generation module receives at least one of said alignment configuration data from passcode input module and generates a plurality of passcode hypotheses. An authentication module receives the passcode hypotheses and compares the passcode hypotheses with the passcodes of registered users stored in a data store. The passcode hypotheses are updated after each new alignment configuration data entered by the user. The authentication module authenticates a user upon finding a passcode hypothesis matching a stored passcode.

34 Claims, 9 Drawing Sheets

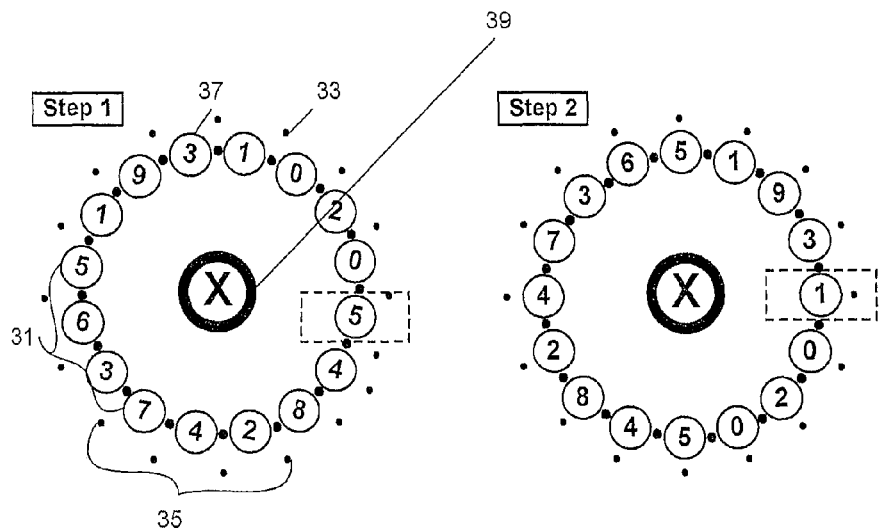
FIGURE 6A   FIGURE 6B
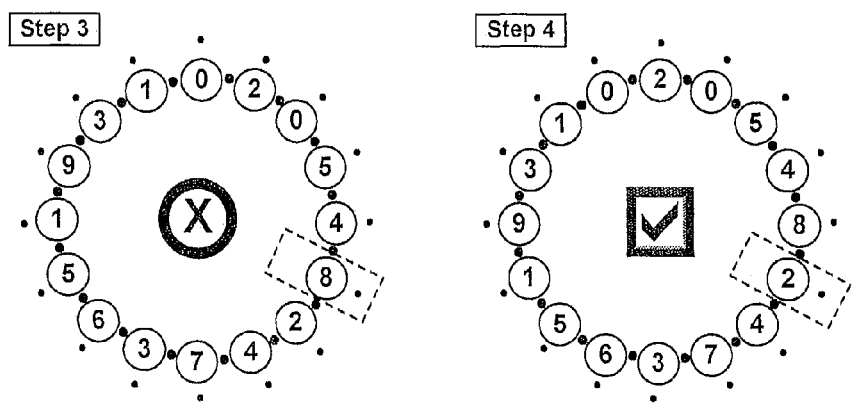
FIGURE 6C   FIGURE 6D

SECURE SYSTEM FOR NON-COVERT USER AUTHENTICATION AND IDENTIFICATION

CROSS-REFERENCE TO RELATED APPLICATIONS

This application claims the benefit of U.S. Provisional Application No. 61/099,613, filed on Sep. 24, 2008. The entire disclosure of the above application is incorporated herein by reference.

FIELD

The present disclosure relates to a user authentication system.

BACKGROUND

Various devices and procedures have been provided for authenticating a user of an electronic system. For instance, to log into an electronic e-mail or bank account using a computer monitor and a local keyboard, users often type in a predefined user name and then type in a secret pass code (password). If the entry matches the pass code stored in a registry, then the identity of the user is authenticated, and the system grants the user access to the account.

Although these conventional systems can provide adequate security for some systems, there exist certain disadvantages. For instance, some newer electronic systems include a display and a remote controller input device. By manipulating the input device, the user can move a cursor on the screen and select icons or other symbols displayed on the screen. These icons can be associated with certain control sequences of the electronic system. Thus, the input device can include relatively few buttons or other controls, and those controls can be used to select a wide variety of variable displayed control icons. This type of system could be used for entering text, for instance, if a QWERTY keyboard is displayed and the user uses the input device to select the desired letters. Accordingly, this type of system could allow the user to enter a user name and a pass code. However, the pass code is substantially unsecure because other persons can watch which symbols are selected on the display. As there is a potential lack of privacy when interacting with a display/remote controller input device system, there is a need for an electronic authentication system that allows a user to conspicuously enter secure passcode information without sacrificing privacy.

This section provides background information related to the present disclosure which is not necessarily prior art.

SUMMARY

A user authentication system for authenticating a user in a conspicuous environment is provided. The user authentication system is comprised of a display displaying an authentication interface having a plurality of alignment markers representing locations on the display and a character dial movable in relation to the alignment markers, wherein the character dial includes a set of available characters that may be selected by the user to enter a passcode. The authentication system is further comprised of a passcode input module operable to receive a user command to move the character dial in relation to the alignment markers and to receive a user command to record alignment configuration data, such that an alignment of the character dial with respect to the alignment markers defines the alignment configuration data. A passcode generation module receives alignment configuration data from the passcode input module and is operable to generate at least one passcode hypothesis from the alignment configuration data. The system is further comprised of a data store storing authentication data including at least one stored passcode. Finally, the system is further comprised of an authentication module in data communication with the data store, wherein the authentication module is operable to receive the passcode hypothesis set and to authenticate the user when one of the passcode hypotheses matches one of the stored passcodes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6A-6D are an exemplary depiction of entering a passcode;

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
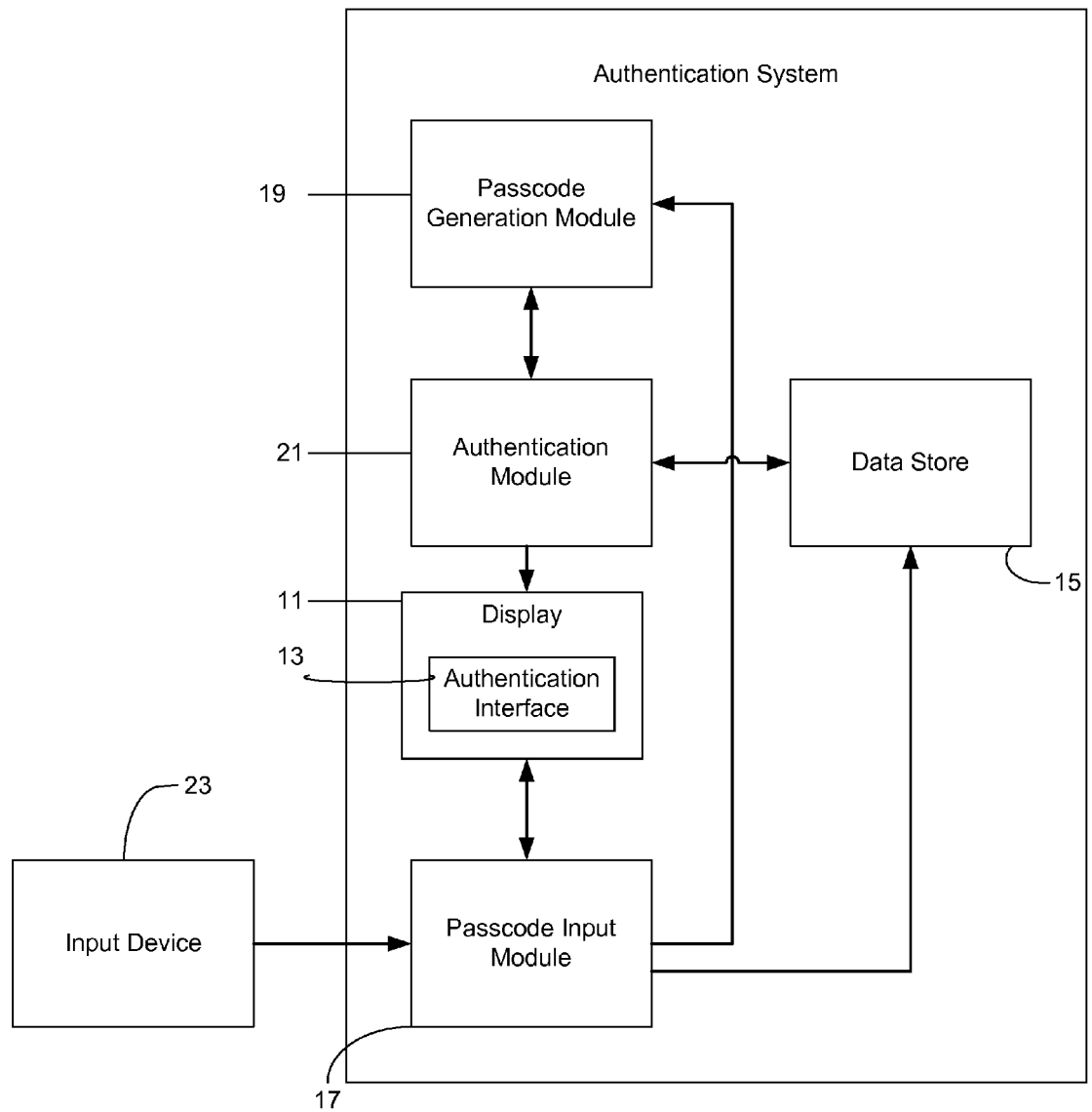
FIG. 1 depicts an system level embodiment of the user authentication system.
Figures 2A, 2B:
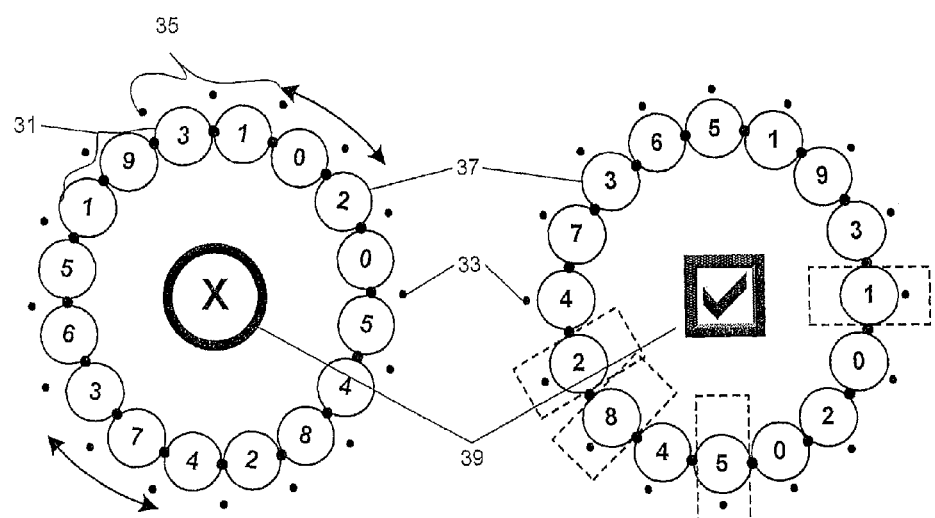
FIGS. 2A and 2B depict an exemplary embodiment of the authentication interface

FIG. 1 depicts a system level exemplary embodiment of a user authentication system. The system is comprised of a display 11, an authentication interface 13, a data store 15, a passcode input module 17, a passcode generation module 19 and an authentication module 21. An exemplary authentication interface 13 is depicted in FIGS. 2A and 2B may be comprised of at least one character dial 31 and a plurality of alignment markers 35, which are described in greater detail below.

Referring back to FIG. 1, a user of the system may enter a passcode using an input device 23. The user uses input device 23 to communicate commands to passcode input module 17 to move a character dial 31 in relation to alignment markers 33. When the user determines that a specific character 37 is in a desired position with respect to a specific alignment marker 33, the user directs passcode input module 17 to record the character and the position value of the alignment marker corresponding to the character, thereby creating alignment configuration data containing at least one passcode element. For example, the user may click a button on a remote controller or other input device 23, thereby signaling to the passcode input module that the user wishes to enter a passcode entry. The character and alignment marker position value information displayed by the authentication interface is then communicated to passcode generation module 19 in the form of alignment configuration data. The user may repeat this process until the desired alignment configuration data is entered. Based on the alignment configuration data received by passcode generation module 19, passcode generation module 19 generates at least one passcode hypothesis. Authentication module 21 compares the generated passcode hypotheses with stored passcodes stored in the data store 15. Upon finding a matching passcode in the data store 15, authentication module 21 authenticates the user and grants the user access to the passcode protected environment.

Display 11 is preferably the portal to the system that the user is attempting to be authenticated on. For example, the display may be the television that the user wishes to view, the monitor of the computer that the user wishes to access, the screen of the mobile phone that the user wishes to use, or the screen of an ATM machine from which the user wishes to obtain funds. Display 11 displays the authentication interface 13. Authentication interface 13 provides a GUI interface, with allows a user to interact with the user authentication system The user may use input device 23 to manipulate authentication interface 13 in order to enter a passcode.

Referring back to FIGS. 2A and 2B. Authentication interface 13 is comprised of a character dial 31 and a plurality of alignment markers 33. Character dial 31 is comprised of the set of available characters 37 that may be used in a passcode. The term character should be understood in its broadest sense, such that any symbol or figure capable of being displayed on display 11 may be used as a character. For example, character dial 31 may be comprised of a combination of alpha-numeric symbols, a set of Chinese or Arabic characters, or a plurality of flags.

Figure 3A:
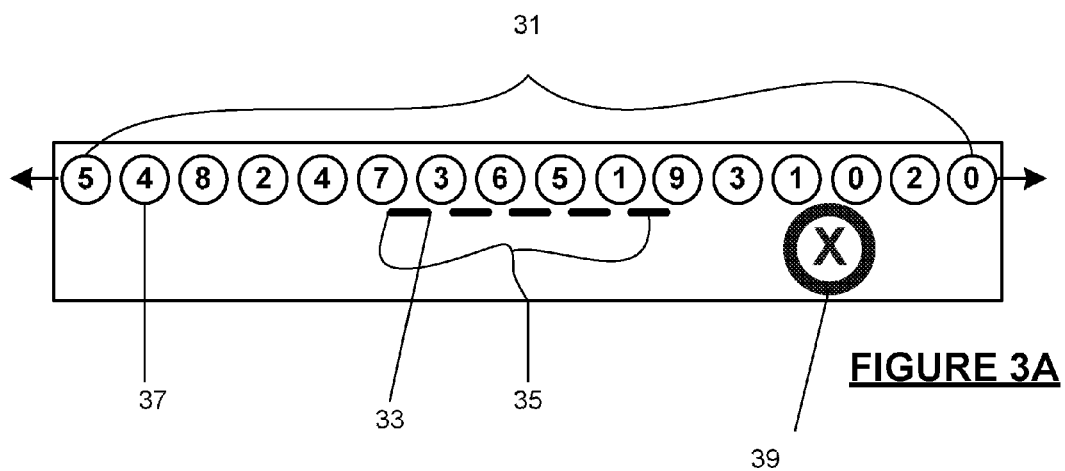
FIGS. 3A and 3B depict an alternative embodiment of the authentication interface.
Figure 3B:
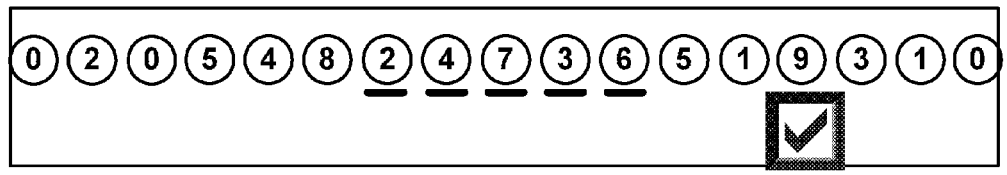

Character dial 31 may have a number of shapes as well. FIG. 2A depicts a configuration of one possible character dial 31, wherein character dial 31 is substantially circular and contains the set of available characters 37 on the peripheral edge of character dial 31. It should be understood by those skilled in the art, that the character dial may take on a number of shapes, including a strait line with a wrap-around feature (See FIGS. 3A and 3B), a square, an oval, an octagon, a pentagon, cube, sphere, cylinder, etc.

In the preferred embodiment, character dial 31 may have reoccurring instances of available characters 37. For example, character dial 31 in FIG. 2A includes 16 available characters 37 comprised of two "0"s, two "1"s, two "2"s, two "3"s, two "4"s, two "5"s, one "6," one "7," one "8" and one "9." Furthermore, available characters 37 on character dial 31 are preferably configured so that they are out of order with respect to one another. An out of order configuration provides added levels of security, as an interloper would have to memorize or otherwise document the entire character dial 31 rather than merely note the position values of a single character while a user is entering a passcode. In a preferred embodiment, the available characters 37 remain in the same position relative to the other available characters 37 when character dial 31 is rotated by a user. For example, in FIG. 2B, available character "6" is two characters away (at alignment marker 15), counterclockwise, from available character "7" (at alignment marker 13) irrespective of any user commands entered by the user.

In a preferred embodiment, character dial 31 is movable with respect to alignment markers 33, whereby the user may move character dial 31 using an input device, such that the user may move a specific available character 37 to a specific alignment marker 33. For example, in FIG. 2B, available character "1" has been moved to alignment indicator "4." In an alternative embodiment, however, the character dial 31 may be fixed and alignment markers 33 may be movable with respect to character dial 31.

Authentication interface 13 further includes a plurality of alignment markers 33. As is described in greater detail below, a passcode is not only dependent on characters entered by the user, but also the position of the character with respect to the alignment markers 33 when the passcode entry is entered. Alignment markers 33 are representative of locations or coordinates on authentication interface 13. Each alignment marker 33 may have a position value indicative of the location of the marker with respect to the other markers. Alignment markers 33 may be configured so that each available character 37 on the character dial 31 corresponds to an alignment marker 33.

In a preferred embodiment, alignment markers 33 are configured to form a login wheel 35. Login wheel 35 is substantially circular and the alignment markers 33 are spaced along the peripheral edge of login wheel 35. With respect to character dial 31, login wheel 35 may be equal to, larger than or smaller than the character dial 31 in diameter. Furthermore, character dial 31 and the login wheel 25 are preferably concentric, such that the two share the same center point 27.

The authentication interface 13 may be comprised of additional elements. For example, authentication interface 13 may include an area for a user to enter or choose a user name. Additionally, an authentication status icon 39 may be included, whereby authentication status icon 39 communicates to a user when a valid passcode has been entered. Authentication status icon 39 in FIG. 2A, in one embodiment, indicates that the user has yet to enter a valid passcode. Authentication status icon 39 in FIG. 2B indicates that the user has entered a valid passcode. Alternatively, authentication status icon 39 may indicate that a correct or incorrect passcode has been entered.

As discussed above, the user uses input device 23 to interact with authentication interface 13 and to enter a passcode. From a user point of view, entering a passcode entry may be a two step process. First, the user aligns character dial 31 with respect to alignment markers 33 by moving a desired available character 37 to a desired alignment marker 33. Second, the user validates the alignment by recording the alignment configuration, thereby creating alignment configuration data. Alignment configuration data is data representative of the alignment of character dial 31 with respect to alignment markers 33. For example, in FIG. 2B, the alignment configuration data may include the following elements, represented by the pairs: (character, position), [(5,0),(1,1),(9,2),(3,3),(1,4),(0,5),(2,6),(0,7),(5,8),(4,9),(8,10),(2,11),(4,12),(7,13),(3,14),(6,15)]. Note that the alignment configuration can be compiled in any form, and is not limited to representation in n-tuples. Further, in the present example, the alignment configuration data is 2-dimensional because the alignment markers are represented by 1-dimensional position values. The alignment configuration data, however, may also represent data having N+1-dimensionality when the alignment markers are represented by N-dimensional position values.

Figure 4:
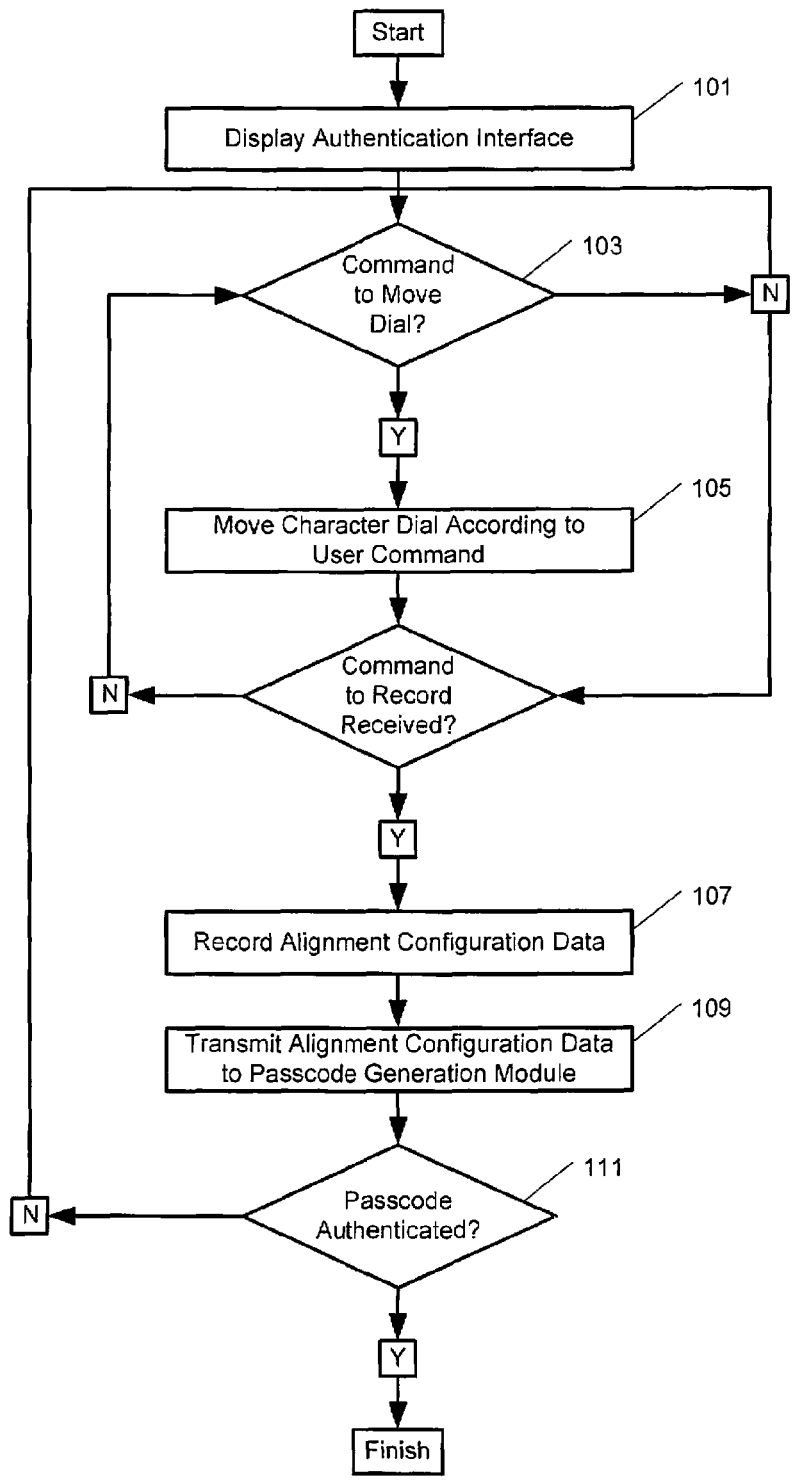
FIG. 4 depicts an exemplary method for receiving alignment configuration data via the passcode input module.

FIG. 4 depicts one possible method employed by passcode input module 17 to receive a passcode hypothesis entry. A user enters a passcode using input device 23, such as a touch sensitive or EZ Touch remote controller, a computer mouse, a trackpad, a touch sensitive screen or a video game controller. At step 101, the user is prompted with the login screen displaying authentication interface 13. At step 103, passcode input module 17 waits for a user command to move the character dial 31. At step 105, the passcode input module receives a user command from input device 23 to move character dial 31. For example, the user may use her finger to trace counterclockwise circular motions on the touchpad of a touch-sensitive remote controller in order to indicate a user command to rotate character dial 31 in a counterclockwise direction, thereby causing input device to transmit signals to passcode input module 17 to rotate character dial 31 counterclockwise. The user may then use her finger to trace clockwise circular motions on the touchpad, thereby indicating a command to move character dial 31 in a clockwise direction. Passcode input module 17 interfaces with authentication interface 13 to move character dial 31 pursuant to the user commands. Character dial 31 will continue to move with respect to alignment markers 33 for as long as the user continues to command the movement of character dial 31. When the user commences the entering of movement commands, character dial 31 waits in a stationary position. The user may reinitiate movement by entering a new user command to rotate character dial 31.

Passcode input module 17 is further operable to receive a user command to record alignment configuration data, thereby validating the alignment configuration displayed on display 11. At step 107, passcode input module 17 may receive a user command to record alignment configuration data. For example, the user may click on the touch pad of a touch sensitive remote controller 23, indicating to passcode input module 17 that the user wishes to enter a passcode element. Upon a user command to record the alignment configuration data, passcode input module 17 determines the position value of each available character 37 on character dial 31 with respect to each corresponding alignment marker 33. At step 111, passcode input module 17 then communicates the alignment configuration data to passcode generation module 19.

Figure 5:
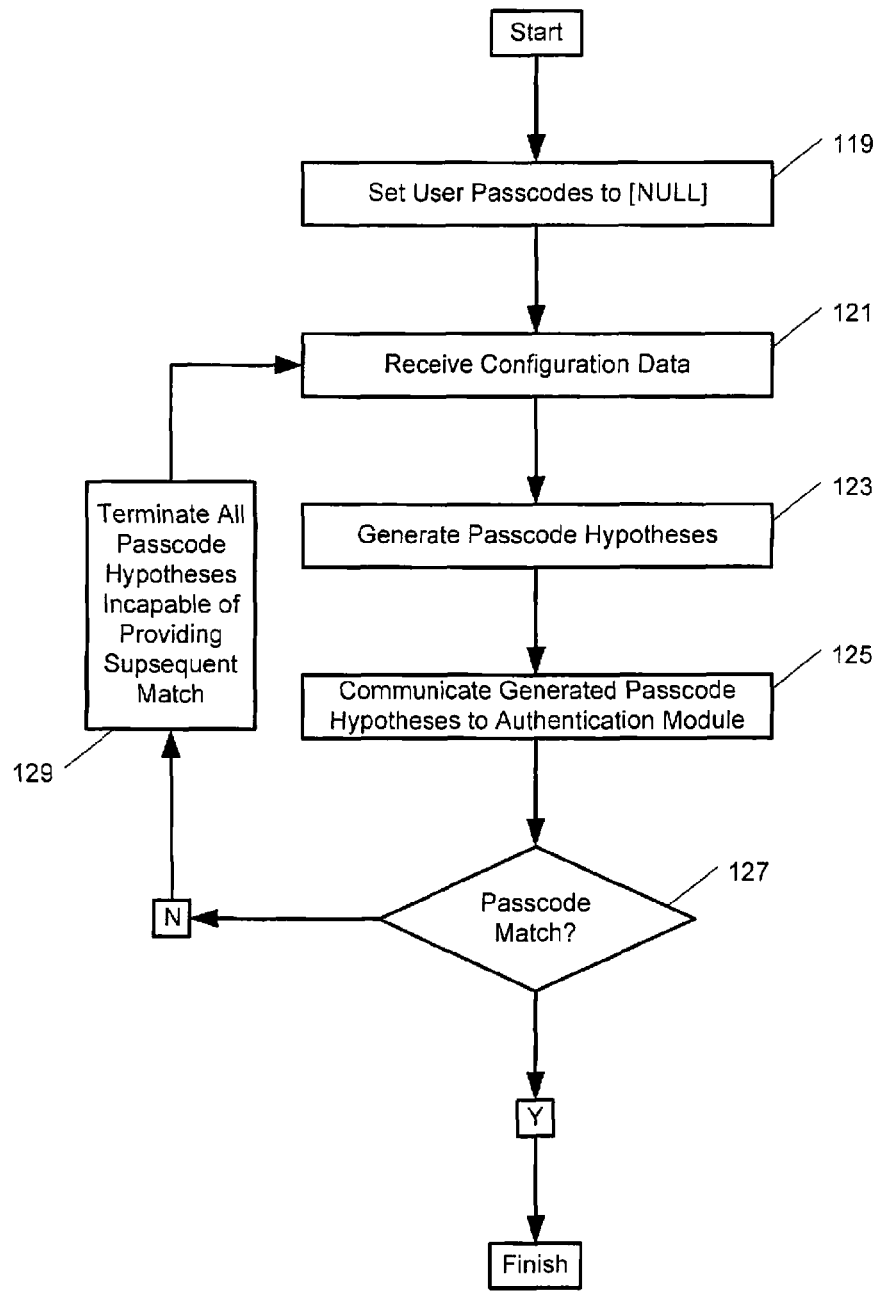
FIG. 5 depicts an exemplary method for generating passcodes.

Passcode generation module 19 is operable to generate at least one passcode hypothesis from the alignment configuration data. A passcode hypothesis is a comprised of at least one character/alignment marker position value combination. Each element of a passcode hypothesis corresponds to an instance of a user validating the alignment configuration displayed on the authentication interface. It should be noted that passcode generation module may generate a significant amount of passcode hypotheses while the user enters his or her user passcode. FIG. 5 presents an exemplary method employed by passcode generation module 19 to generate at least one passcode hypothesis. At step 121, passcode generation module 19 receives alignment configuration data from passcode input module 17 and at step 123 passcode generation module 19 generates a passcode hypothesis based on said alignment configuration data. Each set of alignment configuration data received from passcode input module 17 includes the alignment marker position values for each of the available characters 37. The alignment configuration data then is parsed and used to generate a plurality of passcode hypotheses by passcode generation module. In one sense, the passcode hypotheses can be thought of as a string or array of ordered pairs, wherein the first element of a pair is an available character and the second element is the alignment indicator position value of the available character when the user command to record alignment configuration data was entered. Thus, every iteration of receiving/transmitting alignment configuration data would result in a passcode hypothesis element pairing. Alternatively, a passcode hypothesis can be though of a pair of strings or arrays, an independent string or array containing available characters in the order said available characters were selected and a dependent string or array containing alignment indicator position values for each available character in the independent string. Furthermore, the alignment marker position values can be either representative of the alignment marker's fixed (or absolute) location or the alignment marker's position with respect to the first entered character, hereinafter referred to as offset mode.

FIGS. 6A-6D are now referenced as an example to explain passcode generation in greater detail. In the example, the user wishes to enter the passcode 5-1-8-2 at positions 4-4-5-5 or alternatively in offset mode, 0-0-+1-+1. The passcode, when entered in pairs and in absolute position mode would be ((5,4)(1,4)(8,5)(2,5)). Alternatively, in offset mode, the passcode is ((5,0)(1,0) (8,+1)(2,+1)).

It is noted that the passcode generation module, in generating the above described passcode, may also generate an exponential amount of passcode hypotheses. For example, after step 1, the following ordered pairs are generated by the passcode generation module: (1,0), (0,1) (2,2), (0,3), (5,4), (4,5), (8,4) . . . and (3,15). After step 2, a similar set of pairs is generated and the passcode generation module will generate passcode hypotheses representing all possible combinations of the generated pairs. Thus, after the first step, there may be up to 16 generated passcode hypotheses. After the second step there may be up to 256 generated passcode hypotheses. After four iterations, there may be up to 65,536, or $16^4$, generated passcode hypotheses.

Step 129 may be optionally executed to mitigate the effect of the exponential creation of passcode hypotheses, passcode generation module 19 may communicate with authentication module 21, in order to limit the number of generated passcode hypotheses. For example, authentication module 21 may compare the generated passcode hypotheses with the stored passcodes in data store 15. If after a plurality of generated passcode hypotheses are created, it is determined that a subset of generated passcodes will never provide a subsequent match with any of the stored passcodes, passcode generation module 19 deletes or otherwise terminates the generated subset of passcode hypotheses. Referring to the example above, if the only passcode stored in data store 15 is the passcode provided above, ((5,4)(1,4)(8,5)(2,5)), passcode generation module may delete or otherwise terminate any passcode hypothesis that does not begin with the character "5." It is noted that the preceding embodiment is merely one method of operation for passcode generation module 19 and any passcode generation module 19 operable to receive alignment configuration data having characters and alignment marker position values may be implemented.

The passcode generation module 19 may be configured to generate new passcode hypotheses at every iteration of the method above. In such an embodiment, passcode generation module 19 creates or seeds multiple new passcode hypotheses after each instance of receiving the alignment configuration data. Thus, passcode generation module 19 will create a new passcode hypothesis for each character/alignment marker position value combination contained in alignment configuration data. Passcode generation module also extends all active passcode hypotheses by amending elements contained in the received alignment configuration data to the existing passcode hypotheses. Referring back to the example in FIG. 5, the passcode generation module may generate the following non-exhaustive list of passcode hypotheses after step 4: ((5,4)(1,4)(8,5)(2,5)), ((1,4)(8,5)(2,5)), ((8,5)(2,5)) and ((2, 5)). In this embodiment, the user may reenter the passcode as soon as she realizes that a mistake was made in the passcode entry, without having to reset the authentication system or otherwise indicate that a mistake has been made.

Data store 15 will store the authentication data of all the registered users on the device. Data store 15 may reside in the non-volatile memory of the device or system which the user seeks to be authentication on. Alternatively, data store 15 may be located at an off-site location, such as a centralized server, the site of a cable provider, or on external memory device that a user inserts into the device on which authentication is sought. Users may have to register with the device or system to become eligible users of the device or system. For example, a user can enter user information such as name and address. The user will also enter a passcode having characters and alignment marker position values. The authentication data of the user is then stored in the data store. Further, a level of permissions may also be stored with the authentication data. For example, if the authentication system is used on a television, a parent may desire a child to only watch children-friendly programming. In this example, the parent may limit the channels or programs that the child may watch. Thus, when the child is successfully authenticated on the system, the child will only be able to watch the channels to which permission is granted.

Figure 7:
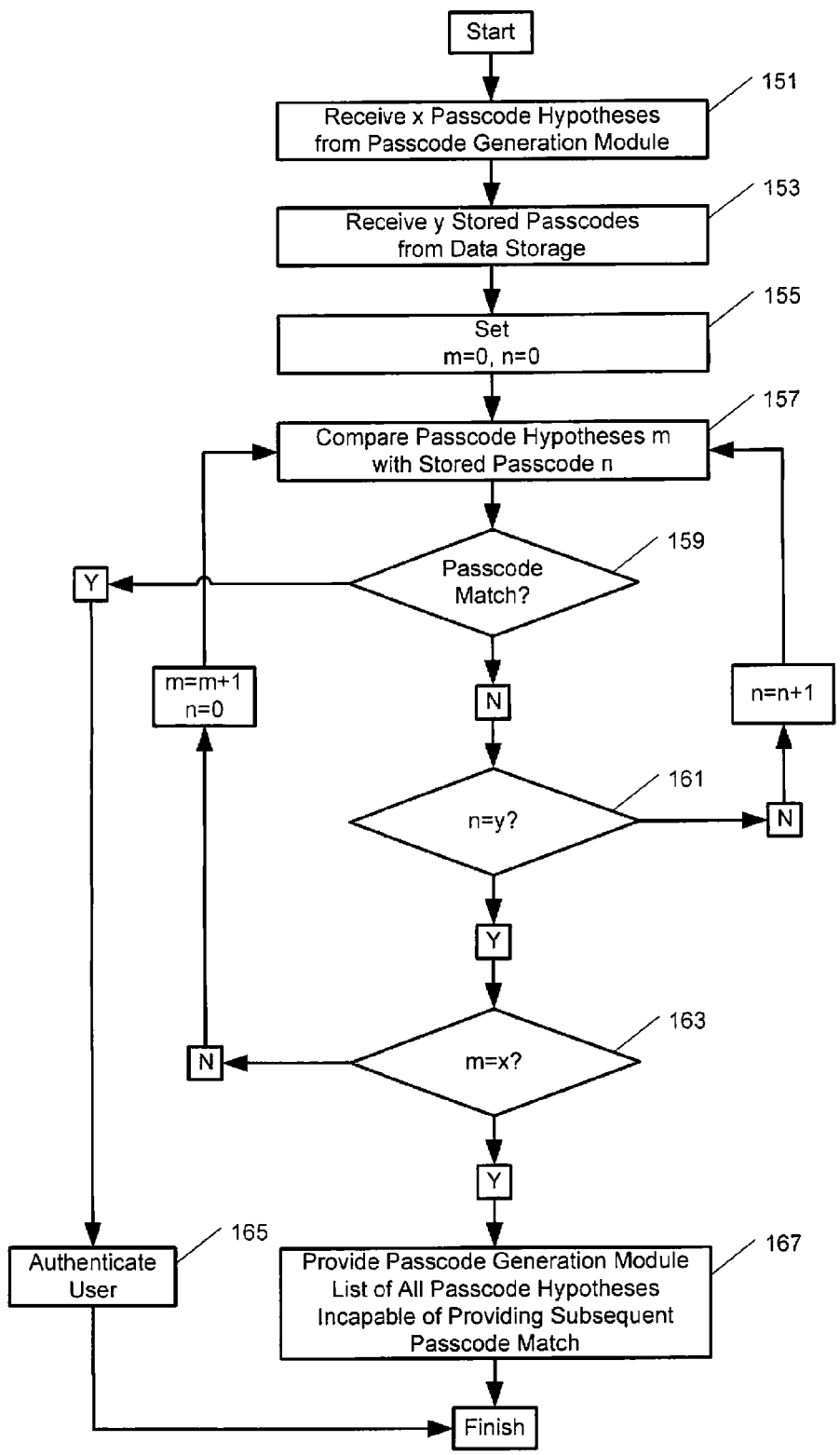
FIG. 7 depicts a exemplary method of authentication a user via an authentication module.

Authentication module 21 receives the generated passcode hypotheses from the passcode generation module and compares said passcode hypotheses with stored passcodes residing in the data store. FIG. 7 depicts one possible method for authenticating a user. At step 151, authentication module 21 receives x generated passcode hypotheses from passcode generation module 19. At step 153, authentication module 21 receives y stored passcodes from datastore 15. Steps 155-163 include comparing the generated passcodes with the stored passcodes. Authentication module 21 will compare the generated passcode hypotheses with each passcode in the data store until a valid passcode is realized by authentication module 21. When a valid passcode is realized, authentication module 21 authenticates the user, thereby granting the user access to the device or system. In an embodiment that prunes or terminates passcode hypotheses incapable of providing a subsequent match, either the passcode generation module 19 or authentication module 21 may terminate the generated passcode hypotheses that will never match a stored passcode, e.g. any generated passcode hypotheses beginning with the character "6" wherein no stored passcodes begin with the character "6."

It is further noted, that the system may require the user to have to submit a user name or id card prior to entering a passcode. In the alternative embodiment, the user passcode must match the stored passcode corresponding to the submitted user name or id card.

Figure 8A:
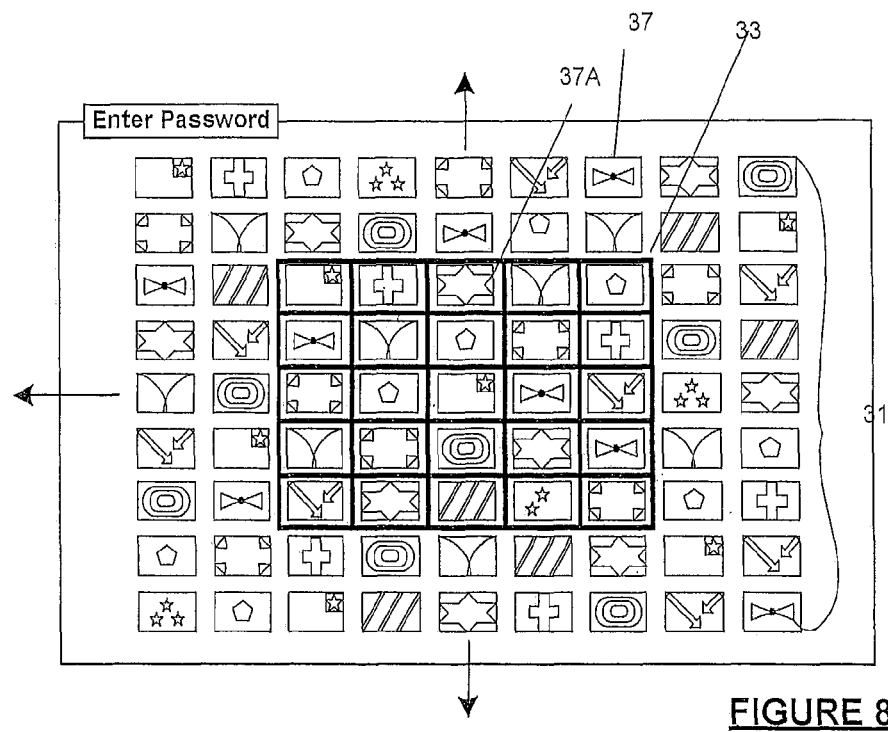
FIGS. 8A and 8B depict an alternative embodiment of the authentication interface.
Figure 8B:
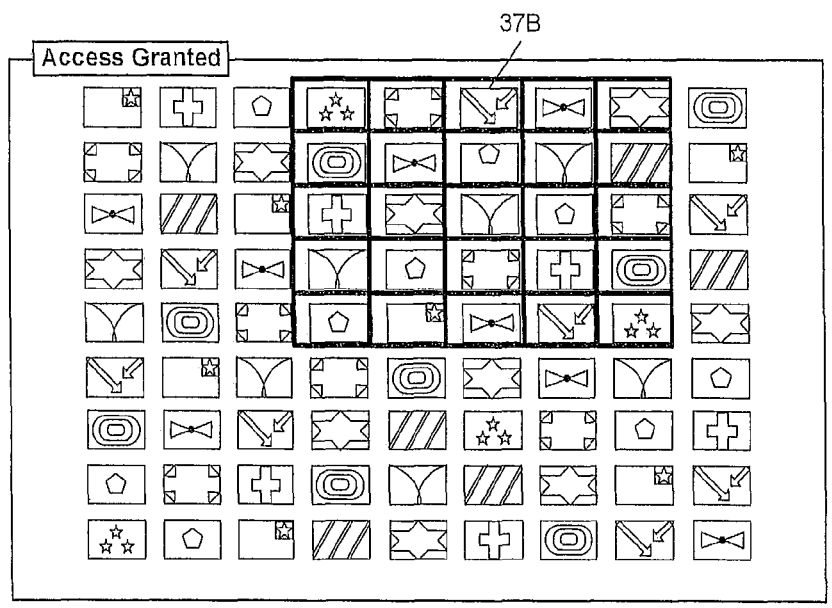

The foregoing disclosure outlined possible embodiments of a user authentication system wherein the character dial was movable with respect to the alignment markers. FIG. 8 depicts a user authentication interface 13 wherein the alignment markers 31 are movable with respect to the available characters 37. Authentication interface 13, in this particular embodiment, is comprised of a 9×9 grid of available characters 37 and 5×5 grid of alignment markers 33. Alignment markers 33 are superimposed onto the available characters and movable with respect to the available characters. Unlike the previously disclosed embodiment, wherein the position values were one-dimensional, the alignment marker position values in the present embodiment are two-dimensional such that every character 37 corresponding to an alignment marker 33 may be assigned an x-coordinate and a y-coordinate. For example, in FIG. 8A at step 1, character 33A (the flag with the six-point star) is located at column 3, row 1 or (3,1). In FIG. 8B, character 33B (the flag with the two arrows) is at column 4, row 5 or (4,5). Thus, the user authentication system may be implemented so that the alignment configuration data contains a character as well as a two-dimensional alignment marker position value. The passcode input module, passcode generation module, authentication module, and data store, would require minimal alternations in functionality to support the two-dimensional authentication interface. Further, an authentication interface having 3-dimensional alignment markers may be implemented. In such an embodiment, the alignment marker position value would essentially be comprised of an x-value, a y-value and a z-value.

Lastly, it is noted that the available characters may or may not retain their ordering with respect to the other available characters after each login step (i.e. after each validation of an alignment configuration). Upon starting up a new login session, the ordering of the available characters may also be reordered, so that a person watching a previous login attempt cannot memorize certain sequences in order to replicate the passcode.

In an exemplary embodiment, a user may use a touch sensitive remote controller as the input device used to enter a passcode. The user may use the touchpad of the remote controller to trace the actual characters of the passcode. The touchpad of the remote controller has capacitive sensors that can detect and track the movement trajectory of the user's fingers. As the user moves his or her finger on the touch pad, the remote controller transmits the drawn characters to the passcode input module. The passcode input module will receive the drawn characters and transmit the drawn characters to the passcode generation module. In this embodiment the passcode generation module will employ character recognition software such as Optical Character Recognition and stroke recognition software to recognize and interpret the pattern drawn by the user. The user can enter multiple characters, thereby entering a passcode. The authentication module can then compare the generated passcode with passcodes stored in the data store. When all the characters needed for the passcode are validated, then the user will be provided access to the system to which authentication was required.

In this embodiment, the user can enter alpha-numeric characters and other symbols found on a QWERTY keyboard. Additionally, the system can be configured to accept any symbol or drawing. For example, the user may enter Japanese or Chinese characters, a drawing of a star, or the user's signature.

The foregoing disclosures present multiple embodiments of an interloper-safe user authentication system. The claimed authentication system may be used on television systems, video game systems, ATMs, computers systems, and any other system where entering a passcode may be done in front of other people. The user authentication system is ideal for integration with a remote controller system having touch-sensitive touchpads. This is because the remote controller does not include very many physical buttons or other input devices, and the system largely relies instead on navigation with the touchpads coupled with on-screen display of the navigation. In consumer electronic products where a simplified, intuitive remote controller is desired, the user authentication system can provide security on an as-needed basis, ranging from minimally secure to extremely secure depending on the type of resource being accessed. The system, however is adapted to employ a number of input devices such as a touch sensitive remote controllers, a touch screen, a mouse, a mouse track pad, a joystick or a video game controller.

Figure 9:
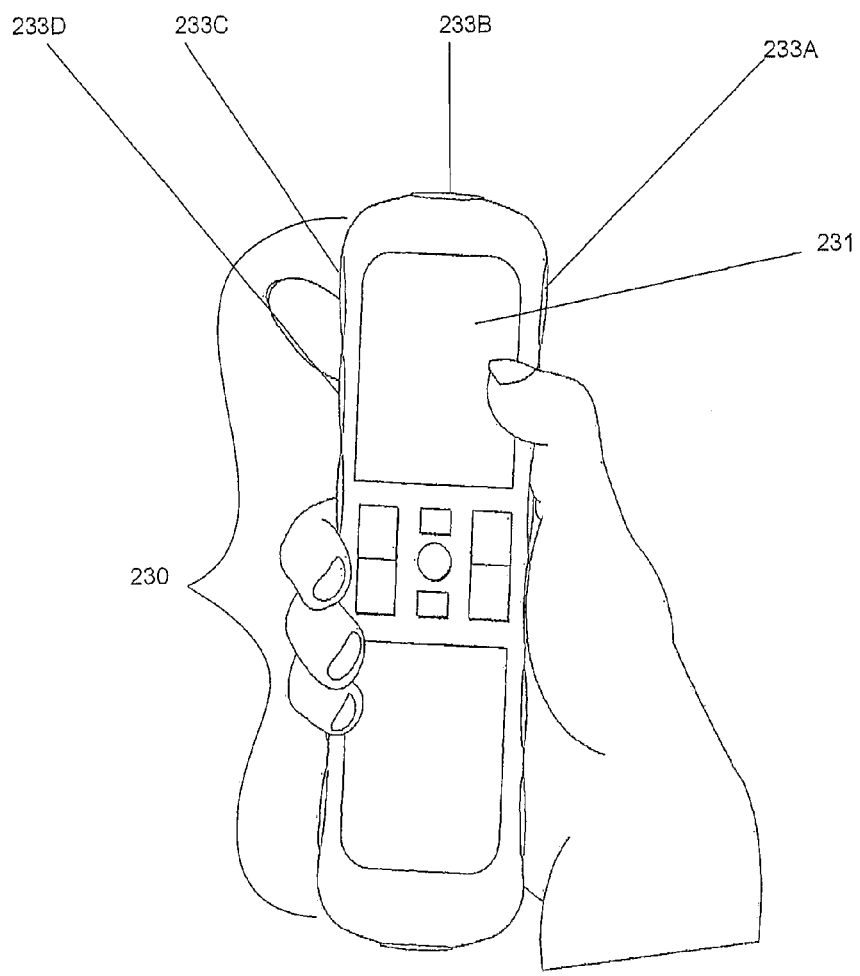
FIG. 9 depicts an exemplary touch-sensitive input device.

FIG. 9 illustrates an exemplary remote controller 230 according to various aspects of the present disclosure. As shown in FIG. 9, the exterior of the remote controller 16 includes a touchpad 231 and one or more soft keys 233a-233d. A user can direct movement of the authentication interface 13 by gently placing his finger or thumb on touchpad 231 and by dragging a finger or thumb along the touchpad 22 in the direction of which the user wishes character dial 31 or alignment markers 33 to move. While the user has a finger or thumb on the touchpad 231, the user can click on the touchpad 231 by applying greater force followed by releasing the force to select a key.

Important functions of the remote controller 230 (such as, for example, volume, channel, and mute) can be associated with specific selection buttons 233a-233d of the touchpad 231. The selection buttons 233a-233d can be designated by a specific touchpad button that is painted or illuminated on the touchpad 231. This allows the user to use the remote controller 230 in complete darkness without having to look away from the content being displayed on the display device 11.

Once a user is logged in to the system, the functions of the television or system can be controlled by simply touching the buttons or be controlled by performing a specific gesture. In one example, sliding a finger or thumb up or down on the right side of the touchpad 231 can trigger a volume up or volume down action. In another example, sliding a finger or thumb right or left on the top side of the touchpad 231 can trigger a channel up or channel down action.

In various embodiments, the body of the remote controller 230 can be made of a soft material, allowing the remote controller 230 to be squeezed. The squeezing of the remote controller 230 can be performed by the user to trigger certain actions. For example, the squeezing of the remote controller 230 may trigger the authentication system to initialize and wait for a passcode.

The internal components of the remote controller 230 can include, but are not limited to, input sensors, output actuators, an input controller, an output controller, a process handler, a wireless transmitter (e.g., RF, Bluetooth, etc.), and/or combinations thereof. The inputs sensors can include touchpad sensors. The touchpad sensors can be single-position registering touchpad sensors mounted side-by-side that allow for the selection of at least two contact points on the touchpad 231 simultaneously. Alternatively, the touchpad sensors can be a single multi-touch capable touchpad sensor that can register, with equal precision, two points of contact at the same time. In various embodiments, the touchpad sensors can register pressure information to allow the touchpad 231 to be clickable.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A system for authentication of a user comprising:
a display displaying an authentication interface having a plurality of alignment markers representing locations on the display and a character dial movable in relation to the alignment markers, wherein the character dial includes a set of available characters, at least some of the characters being presented multiple times, that may be selected by the user to enter a passcode;
a passcode input module receiving a user command to move the character dial in relation to the alignment markers and receiving a user command to record alignment configuration data, such that an alignment of the character dial with respect to the alignment markers defines the alignment configuration data, wherein alignment configuration data includes at least one available character and an alignment marker position value expressed in memory as an offset relative to a user-defined starting position, wherein the alignment marker position value indicates the position of the at least one character with respect to one of the alignment markers;
a passcode generation module receiving alignment configuration data from the passcode input module operable to concurrently generate a plurality of passcode hypotheses from the alignment configuration data, each of the passcode hypotheses including at least one available character and at least one alignment marker position value;
a data store storing authentication data including at least one stored passcode, a stored passcode including at least one character and at least one alignment marker position value; and
an authentication module in data communication with the data store, the authentication module operable to concurrently process each of the passcode hypotheses and to authenticate the user when one of the passcode hypotheses matches one of the stored passcodes.

2. The system of claim 1 further comprising a touch pad operable to receive the user command and to transmit said user command to the passcode input module.

3. The system of claim 2, wherein said touch pad is operably coupled to a touch-sensitive remote controller having a touchpad sensor.

4. The system of claim 2, wherein said touch pad is a mouse pad of a laptop computer.

5. The system of claim 1, wherein said authentication interface further comprises a wheel having a substantially circular shape, wherein the alignment markers are positioned along a peripheral edge of the wheel.

6. The system claim of 5, wherein said character dial has a substantially circular shape, the characters positioned along a peripheral edge of the character dial; the character dial concentric with the login wheel.

7. The system of claim 6 wherein said passcode input module moves said character dial relative to the login wheel by rotating said character dial about its center, wherein said characters on said dial correspond to an alignment marker when said dial is stationary.

8. The system of claim 1 wherein said passcode generation module is operable to amend one of the characters contained in the alignment configuration data to the passcode hypothesis and to amend one of the alignment marker position value contained in the alignment configuration data to said passcode hypothesis.

9. The system of claim 1 wherein said passcode generation module is operable to generate a passcode hypothesis wherein the passcode hypothesis has a first character corresponding to a first alignment marker position value and wherein the remaining characters in the passcode hypothesis have corresponding alignment marker position values calculated in relation to the first alignment marker position value.

10. The system of claim 1 wherein the alignment marker position values are one-dimensional.

11. The system of claim 1 wherein the alignment markers position values are two-dimensional.

12. The system of claim 1 wherein the alignment marker position values are three-dimensional.

13. The system of claim 1 wherein the alignment marker position values are N-dimensional.

14. An authentication interface for entering a user passcode comprising:
a display displaying a character dial, the character dial including a set of available characters that a user may select to enter the passcode, at least some of the characters being presented multiple times;
the display displaying a plurality of alignment markers;
a passcode input module receiving a user command to move the character dial in relation to the alignment markers;
the passcode input module operable to receive a command to record alignment configuration data defined by the alignment of the character dial with respect to the alignment markers and to communicate the alignment configuration data to a passcode generation module, the alignment configuration data including at least one available character and at least one alignment indicator position value expressed in memory as an offset relative to a user-defined starting position and indicative of the position of one of the characters with respect to one of the alignment indicators; and
the passcode generation module operable to concurrently generate a plurality of passcode, hypotheses based on said alignment configuration data, each passcode hypothesis including at least one character selected by the user and at least one alignment marker position value corresponding to one of the characters in the passcode hypothesis.

15. The authentication interface of claim 14 further comprising a wheel having a substantially circular shape, the plurality of alignment markers located substantially along a peripheral edge of the wheel.

16. The authentication interface of claim 15 wherein the character dial is substantially circular, the available characters located substantially along a peripheral edge of the character dial.

17. The interface of claim 16 wherein said character dial is coaxial with the wheel.

18. The authentication interface of claim 10 further comprising an authentication indicator operable to indicate to the user when a successful authentication attempt has occurred.

19. The authentication interface of claim 14 wherein said passcode input module interfaces with a remote controller having a touch-sensitive pad, the remote controller operable to receive a command from the user and to communicate said command to said passcode input module.

20. The authentication interface of claim 14 wherein the passcode generation module is operable to generate the passcode hypothesis by amending one of the characters included in the alignment configuration data to the passcode hypothesis and by amending one of the alignment marker position values included in the alignment configuration data to the passcode hypothesis.

21. The authentication interface of claim 20 wherein said passcode generation module is operable to generate multiple passcode hypotheses.

22. The authentication interface of claim 14 further comprising a data store operable to store authentication data, wherein the authentication data includes at least one stored passcode representing a passcode of a registered user, the stored passcode including at least one character and at least one alignment marker position value.

23. A system for authenticating a user in a conspicuous environment comprising:
a display displaying a substantially circular wheel having a predetermined amount of alignment markers located along a peripheral edge of the wheel;
the display module displaying a substantially circular character dial having a predetermined amount of available characters located along a peripheral edge of said character dial, wherein said character dial is concentric with the wheel and wherein the amount of alignment markers is equal to the amount of characters and wherein at least some of the characters are presented multiple times;
the character dial rotatable about its center with respect to the alignment markers;
a passcode input module operable to receive user commands, wherein said user commands include rotating said character dial;
the passcode input module operable to record alignment configuration data, the alignment configuration data defined by the alignment of the character dial with respect to the alignment markers, wherein the alignment configuration data includes at least one character and at least one alignment marker position value expressed in memory as an offset relative to a user-defined starting position and representing the position of a character with respect to an alignment marker;
a passcode generation module receiving the alignment configuration data operable to concurrently generate a plurality of passcode hypotheses, each hypothesis having at least one character and one alignment marker position value based on the received alignment configuration data;
a data store storing authentication data including at least one stored passcode, a stored passcode including at least one character and at least one alignment marker position value; and
an authentication module in data communication with the data store, the authentication module operable to concurrently process each of the passcode hypotheses and to authenticate the user when one of the passcode hypotheses matches one of the stored passcodes.

24. A system for authenticating a user comprising:
a display displaying an authentication interface;
the authentication interface having a plurality of available characters in fixed positions, at least some of the characters being presented multiple times, and a plurality of alignment markers, the alignment markers movable with respect to the available characters;
a passcode input module operable to receive a user command to move the alignment markers in relation to the available characters and to receive a user command to record alignment configuration data defined by the alignment of the alignment markers with respect to the available characters, wherein alignment configuration data includes at least one available character and at least one alignment marker position value expressed in memory as an offset relative to a user-defined starting position and indicative of an alignment marker corresponding to one of the available characters;

said passcode input module further operable to communicate said alignment configuration data to a passcode generation module;

the passcode generation module operable to concurrently generate a plurality of passcode hypotheses from the alignment configuration data, each passcode hypothesis comprised of at least one character and at least one alignment marker position value;

a data store storing authentication data including at least one stored passcode, a stored passcode including at least one character and at least one alignment marker position value; and an authentication module in data communication with the data store, the authentication module operable to concurrently process each of the passcode hypotheses and to authenticate the user when one of the passcode hypotheses matches one of the stored passcodes.

25. An apparatus for authenticating a user, comprising:

a character display comprising a plurality of distinguishable characters positionally arranged in a predetermined relative display pattern and organized as a rotative loop;

a set of plural alignment position indicia positionally arranged in a predetermined pattern that aligns with the display pattern;

the character display and the alignment position indicia being movable to different positions relative to one another by user manipulation, the relative movement being such that each of the plurality of characters aligns with a different one of the position indicia;

a passcode data store configured to store in memory user-defined passcode sequences, each sequence comprising a plurality of character-positional pairs organized in a user-defined sequence;

an input mechanism operable by the user to validate a user-selected alignment and thereby define an association between each of the characters with a different one of the position indicia based on a current alignment and operable to store a character-positional pair for each of the plurality of characters;

a passcode hypothesis generator that generates and stores plural passcode hypotheses in response to each validation alignment operation by the user, using each of the characters-positional pairs associated to generate a different passcode hypothesis; and a passcode authenticator that selectively modifies hypotheses previously stored using the character-positional pairs associated with the current validation alignment operation and based on a comparison of the hypotheses with the user-defined passcode sequences stored in said passcode data store and that authenticates the user when a hypothesis matches one of the passcode sequences in said passcode data store.

26. The apparatus of claim 25 wherein at least some of the characters are presented multiple times.

27. The apparatus of claim 25 wherein the positional relationship between any two indicia is determined by counting the number of indicia between the two indicia as a quantitative measure of the offset between the two indicia and wherein said character-positional pairs represent positional information using said offsets.

28. The apparatus of claim 25 wherein the character-positional pairs represent positional information in terms of predefined absolute positions of the alignment position indicia.

29. The apparatus of claim 25 wherein the passcode authenticator selectively modifies hypotheses previously stored by appending a current character-positional pair to a previously stored hypothesis if the resulting modification at least partially matches one of the user-defined passcode sequences.

30. The apparatus of claim 25 wherein the passcode authenticator selectively modifies hypotheses previously stored by deleting a previously stored hypothesis if appending the current character-positional pair to said previously stored hypothesis does not partially match one of the user-defined passcode sequences.

31. A method of authenticating a user comprising the steps of:

presenting a character display having a plurality of distinguishable characters positionally arranged in a predetermined relative display pattern;

presenting a set of plural alignment position indicia positionally arranged in a predetermined pattern that aligns with the display pattern;

receiving user input to cause the character display and alignment position indicia to assume an initial alignment relationship whereby each of the plurality of characters aligns with a different one of the position indicia;

generating and storing in memory plural passcode hypotheses based on said initial alignment relationship;

iteratively performing the following steps:

a) receiving a further user input to cause the character display and alignment position indicia to assume a new alignment relationship, the new alignment relationship being represented as an offset from said initial alignment relationship; and b) modifying the plural passcode hypotheses stored in memory based on a comparison of the plural passcode hypotheses with the user-defined passcode sequence to generate plural new passcode hypotheses; and iteratively repeating steps a) and b) until one of said passcode hypotheses matches the user-defined passcode sequence.

32. The method of claim 31 wherein step b) includes appending the current character display and alignment position indicia to a passcode hypothesis that at least partially matches the user-defined passcode sequence.

33. The method of claim 31 wherein step b) includes deleting a passcode hypothesis from memory if appending the current character display and alignment position indicia to that hypothesis does not at least partially match the userdefined passcode sequence.

34. The method of claim 31 wherein step b) includes automatically deleting a passcode hypothesis from memory if the user enters a character display and alignment position indicia that, when appended to that passcode hypothesis, does not at least partially match the user-defined passcode sequence.

* * * * *

UNITED STATES PATENT AND TRADEMARK OFFICE
CERTIFICATE OF CORRECTION

PATENT NO. : 8,362,875 B2
APPLICATION NO. : 12/328878
DATED : January 29, 2013
INVENTOR(S) : Philippe Morin et al.

Page 1 of 1

It is certified that error appears in the above-identified patent and that said Letters Patent is hereby corrected as shown below:

In the Claims:

In column 11, line 10, claim 11, "markers" should read -- marker --

In column 11, line 38, claim 14, delete "," after "passcode"

In column 11, line 53, claim 17, insert -- authentication -- between "The" and "interface"

In column 14, lines 53-54, claim 33, "userdefined" should be -- user-defined --

Signed and Sealed this
Fourteenth Day of May, 2013

Teresa Stanek Rea
*Acting Director of the United States Patent and Trademark Office*